(12) United States Patent
Alexandrov

(10) Patent No.: US 12,307,028 B2
(45) Date of Patent: May 20, 2025

(54) WIRELESS ELECTROMAGNETIC RESONANCE-BASED STYLUS

(71) Applicant: DUSOL LIMITED LIABILITY COMPANY, Moscow (RU)

(72) Inventor: Evgeny Borisovich Alexandrov, Moscow (RU)

(73) Assignee: DUSOL LIMITED LIABILITY COMPANY, Moscow (RU)

( * ) Notice: Subject to any disclaimer, the term of this patent is extended or adjusted under 35 U.S.C. 154(b) by 51 days.

(21) Appl. No.: 18/557,874

(22) PCT Filed: Apr. 7, 2022

(86) PCT No.: PCT/RU2022/050120
§ 371 (c)(1),
(2) Date: Oct. 27, 2023

(87) PCT Pub. No.: WO2022/231474
PCT Pub. Date: Nov. 3, 2022

(65) Prior Publication Data
US 2024/0211058 A1    Jun. 27, 2024

(30) Foreign Application Priority Data

Apr. 29, 2021 (RU) ................................ 2021112539

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01); *G06F 2203/04114* (2019.05)

(58) Field of Classification Search
CPC ................. G06F 3/03545; G06F 3/046; G06F 2203/04114
See application file for complete search history.

(56) References Cited

U.S. PATENT DOCUMENTS 5,956,291 A      9/1999   Nehemiah et al.
2016/0048225 A1  2/2016   Curtis
(Continued)

FOREIGN PATENT DOCUMENTS

CN    103365438 A * 10/2013 ......... G06F 3/03545
KR    101859035 B1 * 5/2018 ......... G06F 3/03545

OTHER PUBLICATIONS

Translation of KR101859035B1 (Year: 2018).*
(Continued)

*Primary Examiner* — Lixi C Simpson
(74) *Attorney, Agent, or Firm* — Amster, Rothstein & Ebenstein LLP

(57) ABSTRACT

The invention relates to the field of devices for inputting and displaying information. The technical result is a wireless electromagnetic resonance-based stylus for an information input and display device that is insulated from the surrounding environment. Disclosed is a wireless electromagnetic resonance-based stylus for an information input and display device that is insulated from the surrounding environment, which comprises a housing having a front housing part and a rear housing part; an opening in the front housing part; a tip disposed in the front housing part and arranged so as to be capable of passing through said opening and of moving along the axis of the body, said tip having a front tip part, which extends out of the opening and beyond the housing to allow contact with a glass cover of the device, and a rear tip part; an oscillator circuit disposed in the rear housing part and tuned to resonate with an inductive sensor assembly of the information input and display device; and an insulating means for insulating the oscillator circuit from the surrounding environment, said means being arranged so as to be capable of interacting with the rear tip part when the front tip part is subjected to a mechanical action in order to transmit (Continued)

said mechanical action from the tip and thereby change the resonant frequency of the oscillator circuit.

28 Claims, 12 Drawing Sheets

(56) References Cited

U.S. PATENT DOCUMENTS

2018/0024654 A1    1/2018  Koike et al.
2021/0041964 A1*   2/2021  Tanaka .................. G06F 3/0446
2021/0072848 A1*   3/2021  Fujisawa ............. G06F 3/03545

OTHER PUBLICATIONS

Translation of CN-103365438-A (Year: 2013).*
International Search Report issued Jul. 7, 2022 in connection with PCT International Application No. PCT/RU2022/050120, including English Language Translation.

* cited by examiner

WIRELESS ELECTROMAGNETIC RESONANCE-BASED STYLUS

CROSS-REFERENCE TO RELATED APPLICATIONS

This application is a U.S. national stage entry under 35 U.S.C. § 371 of PCT International Patent Application No. PCT/RU2022/050120, filed Apr. 7, 2022, which claims the benefit of and priority to Russian Patent Application No. 2021112539, filed Apr. 29, 2021, the entire contents of each of which are incorporated herein by reference.

BACKGROUND OF THE INVENTION

The invention relates generally to devices for input and display of information and, more specifically, to devices used in the conditions that require insulation of some parts of the device from the environment, for example, underwater.

Such devices are used, inter alia, for making various records of texts, drawings, and displaying images and other visually percepted information, and for interacting with various applications preloaded into the device's memory.

Underwater activities often require divers and underwater explorers to make notes (e.g. recording a dive profile, dive parameters and conditions), drawings (e.g. diagram of a dive site), and work with special applications pre-loaded into the underwater device memory (e.g. navigation charts, underwater drone control applications, etc.).

Generally, devices having a touch screen based on resistive or capacitive techniques are considered mostly effective for input and display of information, however, the touch screen is unsuitable for underwater use. If the touch device comprises a resistive touch screen with a flexible top layer, the pressure pushing the top layer of the screen towards the inner layer and thus causing an electric current to flow between the layers can lead to erroneous signals. Typically, the resistive screen fails to operate at a depth of 10-15 meters, or even less. If the touch device comprises a capacitive touch screen, erroneous signals may be caused by electrical charge of the water layer adjacent to the touch screen. In both cases, the underwater use of the touch screen device is problematic or even impossible.

To overcome these challenges, touch screen devices are placed in a rigid waterproof housing or a flexible waterproof casing. However, if a flexible casing is used, underwater pressure can press it against the touch-sensitive screen surface and generate erroneous signals. If a rigid housing is used, the touchpad screen may be visible, but the touch layer cannot be accessed through the rigid housing even if it is transparent, and thus it is impossible to input necessary information.

There are conventional solutions that use a membrane placed over the touch screen, with interior of the membrane filled with a dielectric fluid (e.g. gel). The principle of operation of this solution is that by pushing through the upper layer of the flexible membrane, the touch layer of the screen is touched by the lower part of the membrane, so the touchpad can register the touch. However, this solution has significant drawbacks. In particular, input of information through the membrane is insufficiently correct, since the membrane creates an additional touch area with the touch screen surface, which in some cases makes it impossible to control a device with small icons. Another disadvantage is the vulnerability of the device, since the flexible membrane cannot act as a screen protector and can be damaged by sharp objects.

Thus, it seems more functional to use devices in which information is entered with a stylus, while the screen is reliably protected by a special protective glass.

U.S. Pat. No. 5,956,291 (publ. 1999) discloses an electronic mobile device for underwater writing, comprising: a waterproof housing, a built-in dive computer, a digital camera, a ship locator, a sound reproduction system, a screen, a passive electromagnetic pen, and a device for wireless transmission of information to other devices. Information input is performed with a digital electromagnetic pen, and the digital signal is then processed and converted into images displayed on the screen.

The disclosure does not describe the electromagnetic pen structure in detail, but only mentions that the pen is connected to the device by a wire through a plug connection and modified to work underwater at a depth, for example, the pen with the tip are enclosed in the waterproof housing and coated with a layer of silicone gel.

The disadvantage of this device is the provision of an external power source located on the diver's weight belt, which hinders movements and restricts the use (for example, the device cannot be quickly transferred to another diver underwater). Another disadvantage is the need to connect the digital electromagnetic pen to the device, which limits the work with the electromagnetic pen (the wire can get caught on the diver's equipment; if the wire is damaged, the stylus loses its functionality). Another disadvantage is the low sensitivity of the stylus to the amount of pressure on the tip, since the latter is enclosed in the housing and, apparently, is in static state.

At the same time, devices operating on the principle of electromagnetic resonance are known, in which the stylus does not require a wire connection to the device, and the power source is located in the device as such. At the same time, the stylus exhibits high sensitivity due to the ability of the tip to move inside the stylus housing and interact with the stylus components. An example of such a device is the WACOM ONE pen tablet https://www.wacom.com/en-de/products/pen-displays/wacom-one#Specifications. This device enables information input with a special wireless stylus. Such styluses can be also referred to as pen, touch pen or electromagnetic pen.

Main components of the device are a housing, accommodated in the housing an LCD screen, under which an inductive touch unit is disposed, typically comprising printed inductors, a microcontroller and other electronic components necessary to ensure operation of the screen and the inductive touch unit and electrically connected to them, a power source (rechargeable battery), and a wireless stylus accommodating an oscillator circuit tuned to resonate with an inductive touch unit. Furthermore, to enable finger input of information, the device may have a capacitive touchpad placed over the screen.

The advantage of using such tablets with electromagnetic resonance-based screens and touchpads is that they provide highly precise detection of stylus location and therefore high accuracy of data input.

The technology essentially relies on the following. An inductive touch unit containing printed inductors is placed under a screen (e.g. LCD or electronic ink), which is mainly used to display information. Upon applying an alternating voltage, the inductors generate an electromagnetic field on the screen surface. A stylus, accommodating an oscillator circuit tuned to resonate with the inductive touch unit, is used as a pointer. When the stylus is brought to the screen, the circuit modulates the electromagnetic field, changing the inductance of printed inductors disposed under the screen. The closer the touchpad inductor to the oscillator circuit of the stylus, the greater the change in its inductance. Microcontroller captures parameters of the inductors and calculates the stylus location. The stylus does not have own power source, however, it does not merely reflect the energy received as a result of resonance, but generates a response signal with its help, which inter alia transmits information from additional sensors placed in the stylus (if any in a particular stylus) about its inclination, type of the tip, pressing force and other parameters necessary to form a high quality image on the screen. Since the appearance of electromagnetic resonance does not require direct contact between the resonating stylus and the working surface of the initial field, the touchpad can be placed behind the screen, thereby eliminating its negative impact on image quality. Thus, this structure enables tracing location of the stylus even if its tip is at a distance of up to 2 cm from the screen. The closer the stylus is to the screen, the stronger the modulation of the initial field, which carries information about the place and nature of the contact.

In conventional electromagnetic resonance-based tablets, the stylus comprises a hollow housing, a tip movable in the interior of the stylus housing, an oscillator LC circuit including at least a ferrite-core inductor L and a capacitor C.

To ensure interaction between the stylus and the inductive touch unit, the oscillator circuit of the stylus should be tuned with the unit to the electromagnetic resonance mode. At the same time, it is necessary to enable changing the resonant frequency of the stylus oscillator circuit so that the tablet microcontroller can register different events depending on the frequency of stylus response signal.

Thus, the main components of the oscillator circuit of the stylus are the inductor and the capacitor. The inductor provides interaction between the stylus and the tablet, including positioning the cursor and supplying power to the circuit. Meanwhile, the oscillator circuit frequency can be changed by varying such parameters as the capacitance of the capacitor, the inductance of the inductor or the resistance (for example, a resistor, if any) in the electrical circuit of the oscillator circuit.

In prior art electromagnetic resonance-based touchpad devices, the styluses are not waterproof and cannot be used underwater because contact with water will inevitably cause the stylus to short-circuit and become inoperable. Furthermore, there is no ready solution to adapt such styluses to underwater use for entering information, and ensure tightness while maintaining mobility of the oscillator circuit components, which is necessary to change the resonant frequency.

It is also known that underwater devices are generally switched on by a sealed mechanical button containing a spring. At a depth of 60 meters or more, such buttons may not function properly due to high water pressure causing the buttons to stick. The problem is partially solved by mounting a stiffer spring. However, the provision of a stiffer spring causes the need to apply more force to press the button, and besides it does not exclude sticking in any case. In addition, such buttons require regular maintenance with the need to disassemble them and lubricate the sealing ring of the button stem, which is responsible for tightness of this unit.

Thus, there is a need for a reliable information input and display device that can be used in the conditions where it is necessary to insulate some parts of the device from the environment, for example, underwater, with a screen and touchpad, allowing input and visual perception of data on the screen under extreme conditions, such as underwater, providing highly accurate data entry when working with the screen in these conditions, as well as providing reliable screen protection.

There is also a need for a stylus for such a device, which can be used in highly extreme environments, such as deep underwater, to enter information into the device.

SUMMARY OF THE INVENTION

It is an object of the invention to provide an information input and display device, which, due to reliable protection of the screen and electronic and other components in the device housing from the environment, can use the principle of electromagnetic resonance in extreme conditions, for example, underwater.

The other object of the invention is to provide a device which allows input and visual perception of information on the screen in extreme conditions, for example, underwater.

Yet another object of the invention is to provide a device which is capable of non-contact on/off switching in these conditions.

Another object of the invention is to provide a device which exhibits high accuracy of data input when working with the screen in extreme conditions.

The next object of the invention is to provide a wireless stylus for the information input and display device, which, due to reliable protection of electronic and other components accommodated in the stylus housing from the environment, can use the principle of electromagnetic resonance in extreme conditions, for example, underwater, thereby ensuring accurate data entry when operating the device under these conditions.

Advantages offered by the invention include successful use of an electromagnetic resonance-based device with a screen and a touchpad for input and display of information in extreme conditions, for example, underwater, and non-contact on/off switching of the device.

According to one aspect of the invention, there is provided a wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion; an oscillator circuit disposed in the rear housing part and tuned to resonate with an inductive touch unit of the information input and display device, and comprising at least a capacitor and an inductor with a ferrite core split into two parts, one of the parts being stationary, and the other one being movable along the housing axis relative to the first part of the core; an insulating means for insulating the oscillator circuit from the environment, said insulating means being arranged to interact with the rear tip portion when mechanical stimulus is applied upon the front tip portion to transfer the mechanical stimulus from the tip to the movable part of the ferrite core of the inductor and provide relative movement of the movable part of the core with respect to the stationary part for changing the resonant frequency of the oscillator circuit.

In this embodiment of the stylus, oscillation frequency of the oscillator circuit changes due to changing the inductance of the inductor when the movable part of the core moves relative to the stationary part, while the movable part of the ferrite core can interact with the insulating means.

According to another aspect of the invention, there is provided a wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion; an oscillator circuit disposed in the rear housing part and tuned to resonate with an inductive touch unit of the information input and display device, and comprising at least an inductor with a ferrite core having a longitudinal opening, an element of a diamagnetic material arranged to move in the opening of the ferrite core, and a capacitor, sad capacitor being adapted to change the capacity when mechanical stimulus is applied upon it; an insulating means for insulating the oscillator circuit from the environment, said insulating means being arranged to interact with the rear tip portion when mechanical stimulus is applied upon the front tip portion to transfer the mechanical stimulus from the tip to the capacitor by interacting with the element of a diamagnetic material for changing the resonant frequency of the capacitor.

In this embodiment, the oscillation frequency of the oscillator circuit changes due to changing the capacity of the capacitor when mechanical stimulus is applied upon it.

According to a following aspect of the invention, there is provided a wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion; an oscillator circuit disposed in the rear housing part and tuned to resonate with an inductive touch unit of the information input and display device, and comprising at least an inductor with a ferrite core having a longitudinal opening, an element of a diamagnetic material arranged to move in the opening of the ferrite core, a capacitor and a resistor, said resistor being adapted to change the resistance when mechanical stimulus is applied upon it; an insulating means for insulating the oscillator circuit from the environment, said insulating means being arranged to interact with the rear tip portion when mechanical stimulus is applied upon the front tip portion to transfer the mechanical stimulus from the tip to the resistor by interacting with the element of a diamagnetic material for changing the resonant frequency of the oscillator circuit.

In this embodiment, the oscillation frequency of the oscillator circuit changes due to changing the resistance of the resistor when mechanical stimulus is applied upon it.

According to a following embodiment, there is provided a wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion; an oscillator circuit disposed in the rear housing part and tuned to resonate with an inductive touch unit of the information input and display device, and comprising at least an inductor with a ferrite core having a longitudinal opening, an element of a diamagnetic material arranged to move in the opening of the ferrite core, a capacitor and an element of a conductive material comprising a resilient washer and arranged to change the resistance when mechanical stimulus is applied upon it; an insulating means for insulating the oscillator circuit from the environment, said insulating means being arranged to interact with the rear tip portion when mechanical stimulus is applied upon the front tip portion to transfer the mechanical stimulus from the tip to the element of conductive resilient material, forcing it to shrink and press against contacts of the stylus printed board, then uncompress, thereby changing the resistance of the electric circuit of the oscillator circuit. In this embodiment, contacts of the stylus printed board comprise an electrode through which a part of the electrical circuit formed by tracks (contacts) is connected to the other part of the circuit.

In this embodiment of the stylus, the oscillation frequency of the oscillator circuit changes due to changing the resistance of the resistor when mechanical stimulus is applied upon it.

According to any of the above aspects of the invention, the insulating means may comprise a flexible membrane separating the front housing part from the rear housing part to insulate the oscillator circuit from the environment.

The flexible membrane, on one side, insulates the oscillator circuit components from the environment, and on the other side, transfers mechanical stimulus from the stylus tip to the oscillator circuit components to change the resonant frequency of the oscillator circuit.

The insulating means can comprise an impermeable capsule accommodated in the housing, filled with a dielectric fluid and enclosing the oscillator circuit.

To improve the transfer of mechanical stimulus from the stylus tip to the oscillator circuit components, the capsule itself may contain a flexible membrane arranged to interact with the rear tip portion when mechanical stimulus is applied upon the front tip portion.

Preferably, where appropriate, there can be provided a means for returning the movable element of the oscillator circuit to its initial position upon removing the mechanical stimulus from the front tip portion.

Preferably, the rear housing part accommodates a magnet arranged to interact with a reed switch or a Hall sensor of the information input and display device for non-contact switching-on of the device when the stylus with the magnet is brought to a specified place on the device housing.

There is also provided an information input and display device comprising: an environmentally-insulated housing accommodating an electromagnetic resonance-based touchpad comprising, electrically connected with each other, an inductive touch unit, a screen, electronic components including at least a microcontroller, a wireless data transmission unit, a memory unit, a power supply, and a non-contact on/off switching means; wherein the housing of the device has a window with a protective glass to enable viewing information on the screen; and a wireless stylus according to any one of the above aspects of the invention, the oscillator circuit of which is tuned to resonate with the inductive touch unit of the device.

The non-contact on/off switching means preferably comprises a reed switch or a Hall sensor mounted in the device housing and a magnet mounted in the wireless stylus.

Air pockets in the housing can be filled with a dielectric.

Further, the invention will be better understood from its detailed disclosure with reference the accompanying drawings. Understanding that the accompanying drawings depict only typical exemplary embodiments of the invention and are, therefore, not to be considered to be limiting of the scope of protection, the invention will be described and explained with specificity and detail in reference to the accompanying drawings.

DETAILED DESCRIPTION OF THE INVENTION

Figure 1:
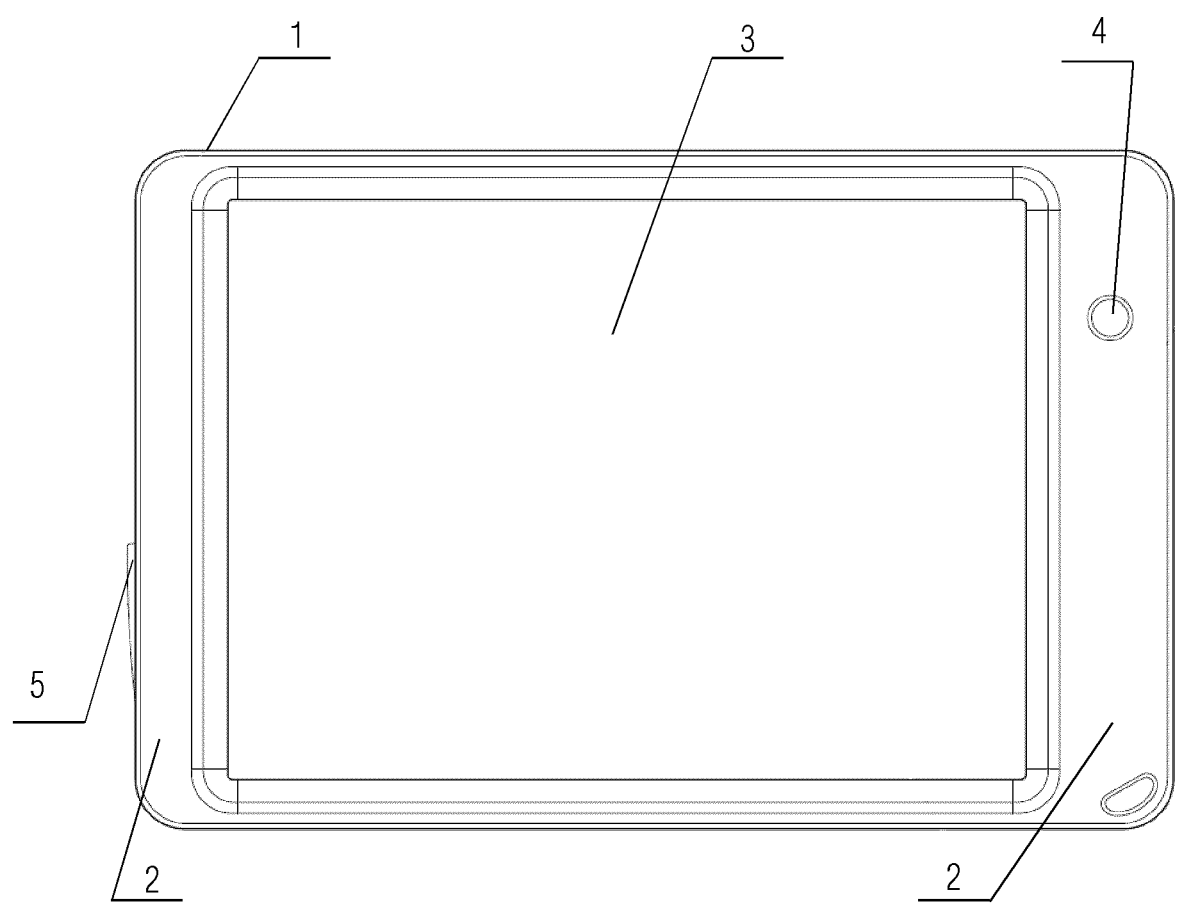
FIG. 1 is a general view, on the screen side, of an information input and display device for use underwater according to the invention, in assembled condition.

FIG. 1 depicts a general view, on the screen side, of an information input and display device in extreme conditions, for example, underwater. The information input and display device includes a housing 1.

Figure 2:
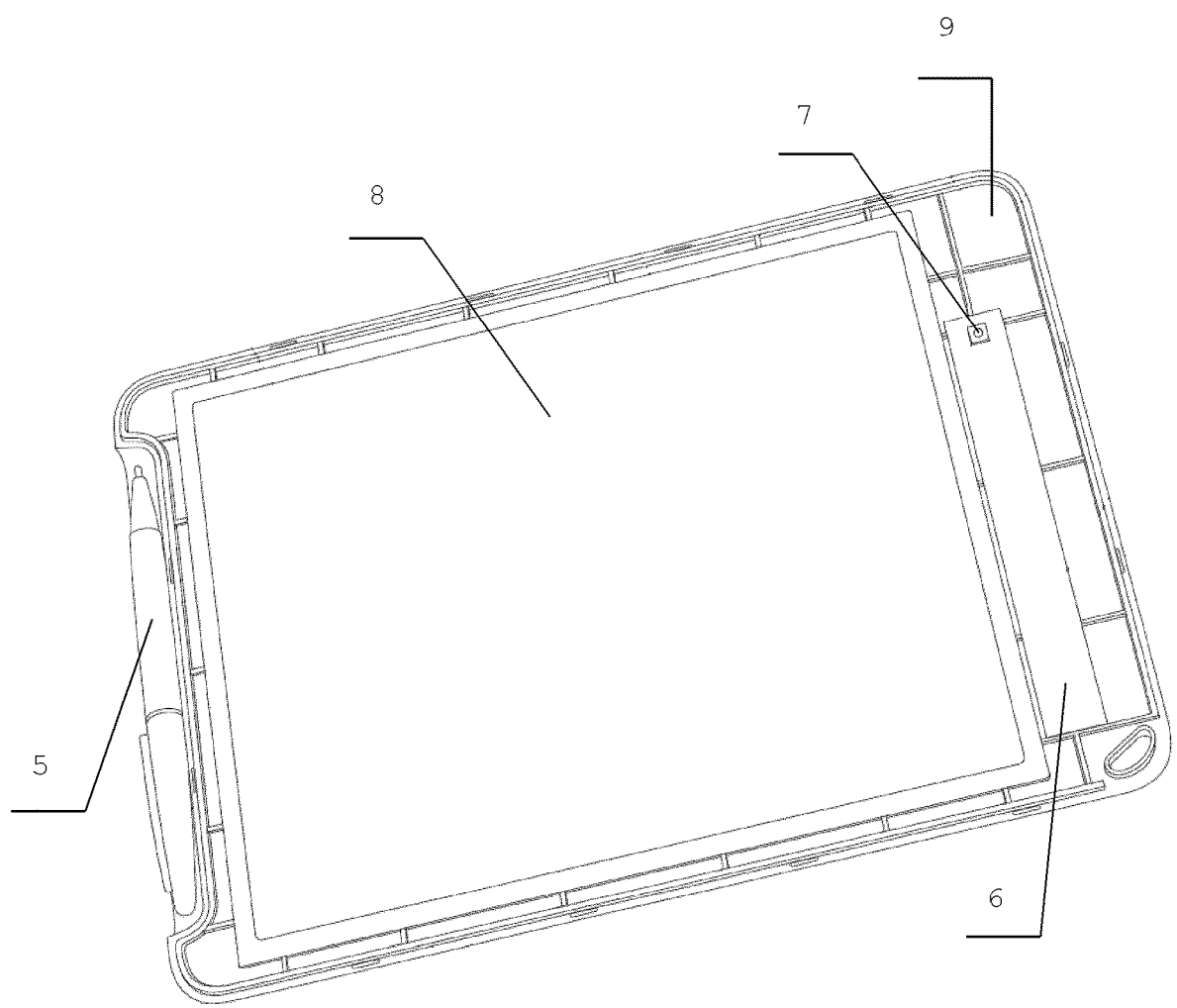
FIG. 2 is a back perspective view of the device showing the interior of housing of the device according to the invention, not filled with a dielectric sealant.

FIG. 2 shows the interior of the housing 1, as viewed from behind, not filled with a dielectric. The housing 1 has a front panel 2 and a back cover 9 and is insulated from the environment by means that are apparent to those skilled in the art, for example, by a sealing element made of rubber, silicone or similar material.

Figure 3:
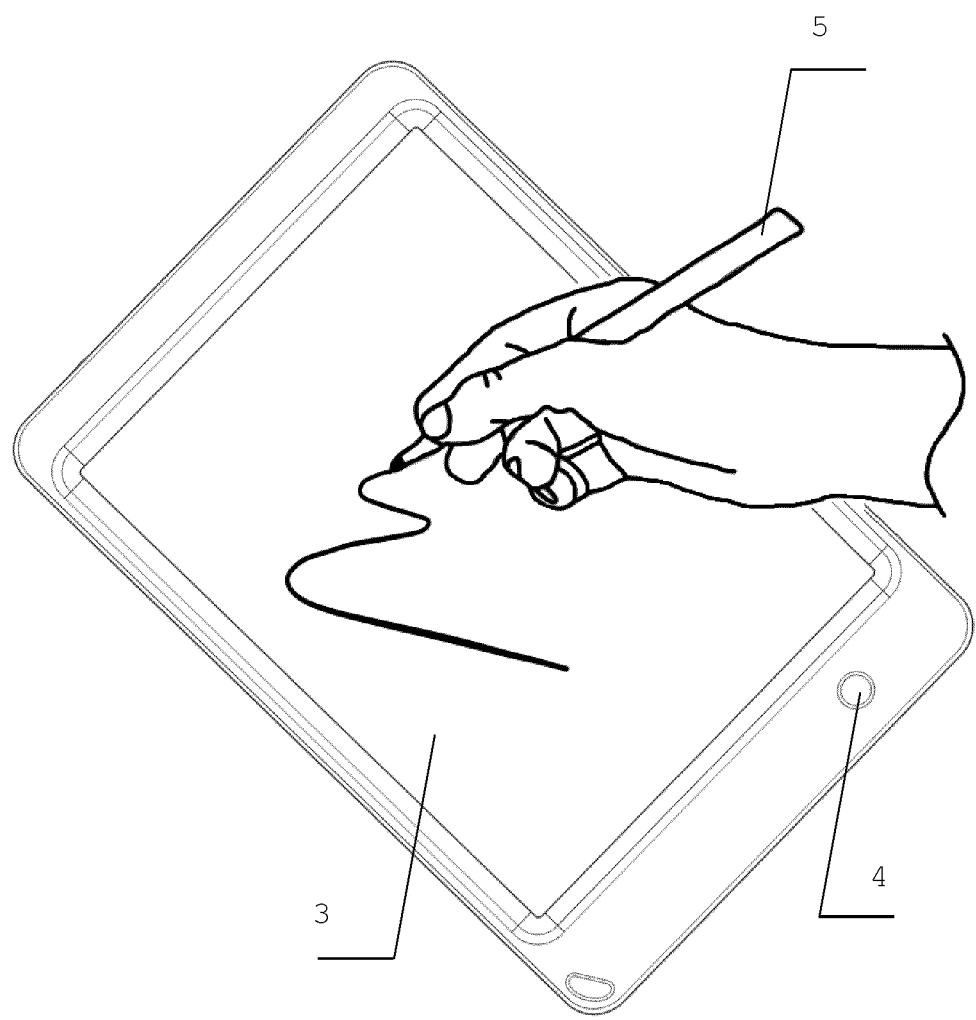
FIG. 3 is a general view of the information input and display device, showing the device in use.
Figure 4:
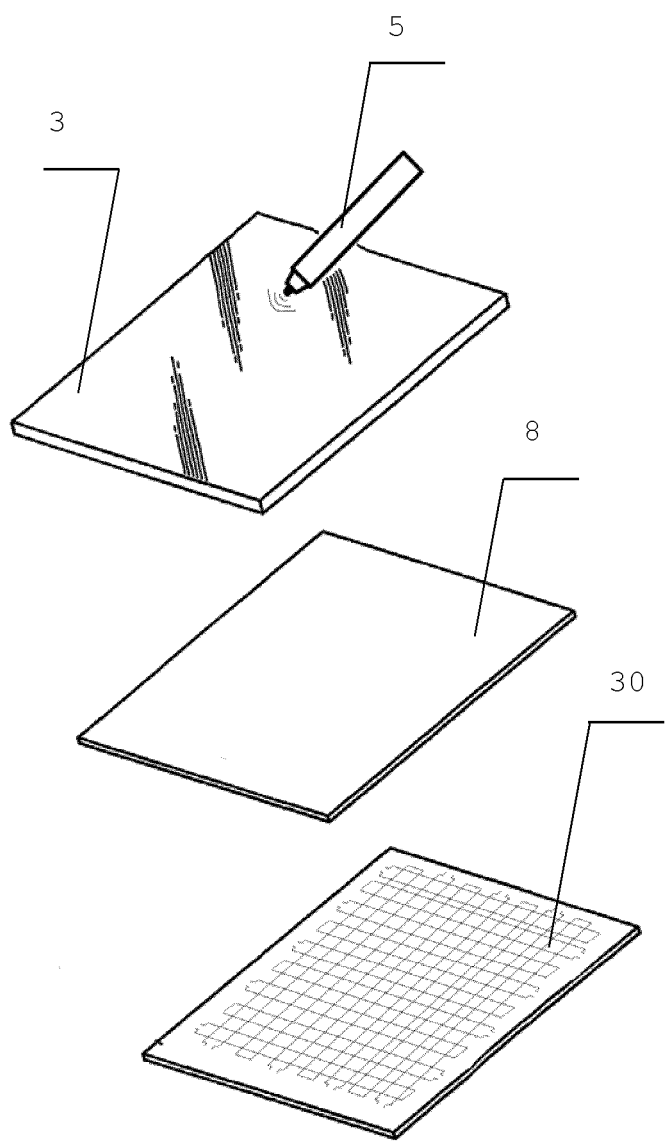
FIG. 4 shows a stylus and successively layered a protective glass, a screen and an electromagnetic resonance (EMR)-based touchpad.
Figure 5:
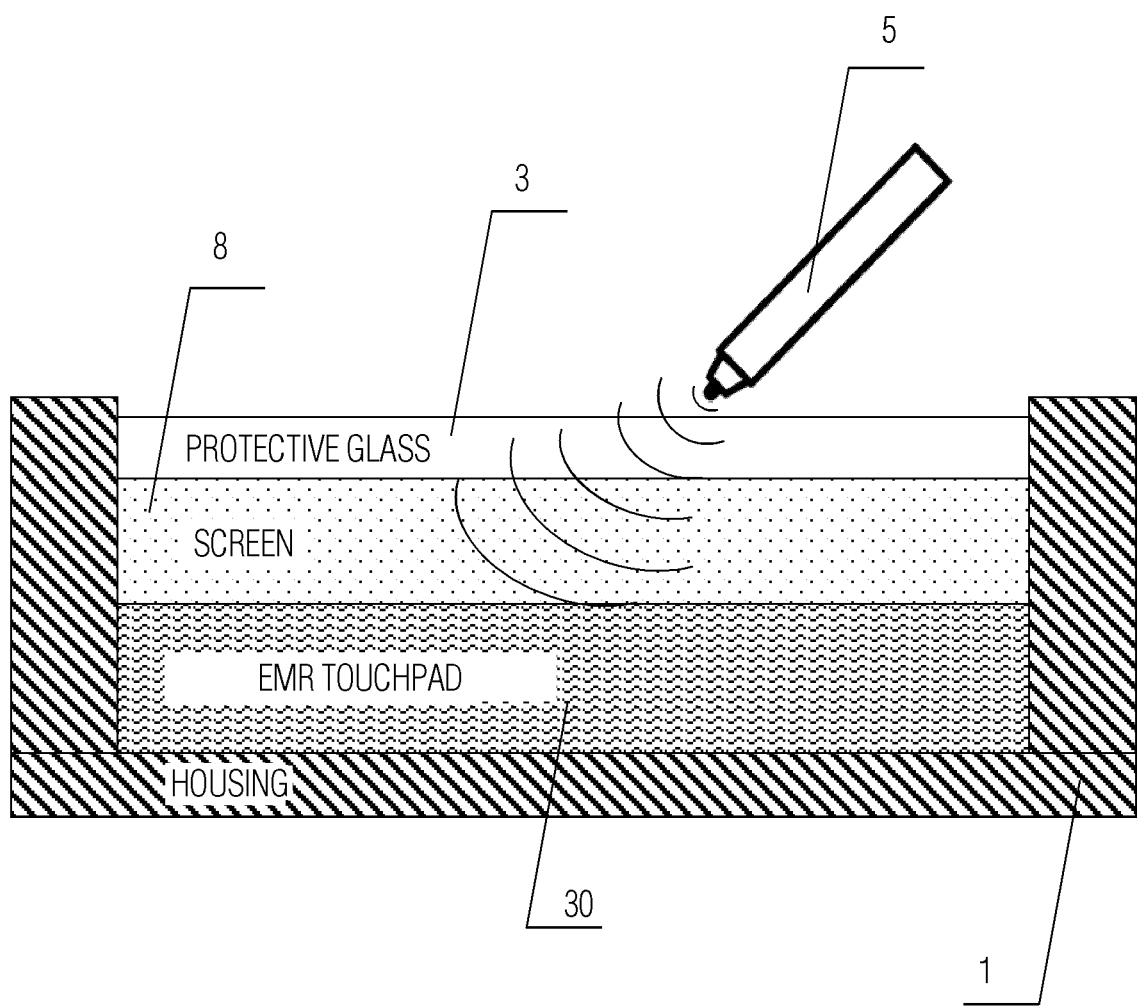
FIG. 5 is a sectional side view of the device explaining the principle of interaction of the stylus with the electromagnetic resonance-based touchpad.

As better seen in FIGS. 3, 4 and 5, the housing 1 has a screen (window) 8. The screen 8 can be an LCD screen, an electronic ink screen, or any other conventional screen, under which an electromagnetic resonance-based touchpad is placed. To operate the device in extreme conditions, for example, underwater, the screen 8 must be insulated from the external environment by a protective glass 3 placed above the screen 8, which is sealed relative to the housing 1 and enables viewing information on the screen.

To improve protective properties of the device according to the present invention, it is preferable to use thermally (tempered) or ion-exchange (chemically) strengthened glass as the protective glass of the device housing. When using a screen with a capacitive touchpad, thickness of the protective glass of the device housing should be within the range of up to 6 mm, depending on the sensitivity of the specific capacitive touchpad used. Tests have shown that the capacitive touchpad remains responsive to finger touch as long as the thickness of thermally or chemically strengthened protective glass does not exceed 6 mm. Moreover, the glass strengthened particularly by a chemical method (ion-exchange) is preferable as a protective glass, since chemically strengthened glass is known to resist to tension on the glass surface up to 700 MPa, enabling its successful use for protection of the screen and the device according to the present invention as a whole.

When information is entered only with a wireless stylus in any environment (underwater or on the surface), polycarbonate glass can be used as the protective glass, which also has better shockproof characteristics compared to ordinary silicate glass. In this case, the device will exhibit improved screen protection against possible mechanical damage. Meanwhile, tests have shown that the wireless stylus of the present invention can safely operate at a distance of up to about 20 mm the from electromagnetic resonance-based touchpad surface. Given the distance from this panel to the protective glass, which is about 10 mm, it is possible to use polycarbonate glass up to 10 mm thick.

Thus, it was determined that thickness of the protective glass 3 of the device should not exceed 10 mm. As will be apparent to those skilled in the art, as the protective glass thickness increases, its weight and optical characteristics change, and it has been found by testing that optimal characteristics in terms of weight, strength and optical properties are achieved with a protective glass having a thickness from 2 mm to 4 mm.

A touchpad 30 operating on the electromagnetic resonance principle is disposed under the screen 8. The touchpad 30 comprises an inductive touch unit (not shown) having inductors, typically printed.

The housing also accommodates electrically connected electronic components including: a microcontroller, a wireless data transmission unit, a memory unit, and a power source. The microcontroller can be any suitable conventional microcontroller that can process wireless stylus signals, e.g. ASIC W8003 or M37534M4-122FP 634102 or 74HC74D AX564. The choice of appropriate wireless data transmission unit, memory unit, power supply is also apparent to those skilled in the art, does not essentially relate to the subject matter of this invention, and therefore these devices are not a feature of the present disclosure. For example, Samsung Galaxy Tab S6 tablet computer comprises such units.

An important part of the device is a wireless stylus 5 having an oscillator circuit tuned to resonate with the inductive touch unit of the device. The stylus 5 will be described in detail below.

The device also comprises a non-contact on/off switching means. The means can be implemented by conventional devices such as a reed switch or a Hall sensor.

For example, the means for non-contact on/off switching of the device can comprise an electronic printed circuit board 6 mounted in the device housing with a reed switch, or a Hall sensor 7 and a magnet provided in the wireless stylus 5. The housing 1 comprises a place 4 for applying the stylus 5 magnet to switch the device on and off.

The advantage of a reed switch or a Hall sensor used as an underwater non-contact on/off switching means substantially improves reliability of the device by eliminating the use of mechanical buttons that can sink as the depth and pressure of the environment increase. It is obvious that the reed switch or the Hall sensor accommodated in the device housing is protected from the effects of water and direct pressure on them. The operation principle of the reed switch and the Hall sensor relies on the effect of a magnetic field applied to them, which in the present invention will be transmitted through the wall of the device housing. If the device housing is made of a material that shields the magnetic field, a glass or an insert made of another material that does not shield the magnetic field can be hermetically disposed at the location of the reed switch or the Hall sensor. The magnet can be accommodated in the wireless stylus.

Figure 6:
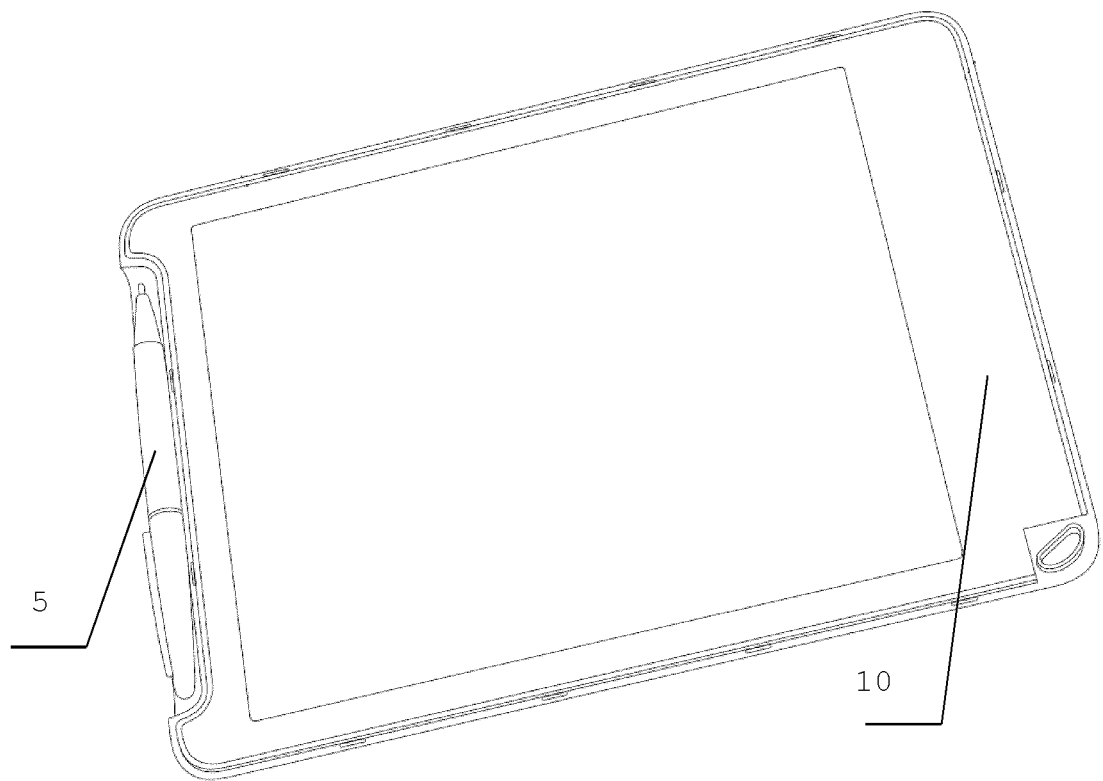
FIG. 6 is a back perspective view of the device, showing the interior of the housing of the device according to the invention, which is already filled with a dielectric.

As better seen in FIG. 6, which shows interior of the housing 1, air pockets in the housing 1 are filled with a dielectric 10.

The dielectric 10 eliminates the effect of varying ambient pressure as the depth changes, since the material fills air pockets and expels air therefrom.

It is desirable that the dielectric was able to change, in a while after mixing its components, from initial viscous state to final rubbery state. This is because during the change from viscous state to rubbery one, the dielectric expels air from free cavities of the device, and fills free air pockets in the closed housing, thereby substantially reducing the effect of ambient pressure and force on the device enclosed in the housing, when the external pressure of the environment changes with the depth.

The dielectric solidifies after being placed in the device housing and does not flow out, reliably fixing the position of all internal components and reliably protecting them. In addition, the present dielectric is rubbery in the working condition, which is very important for use under exposure to ambient pressure as the depth increases, since in the solidified state it is able to reduce vibration, shock and other negative effects on the device with a touch screen located therein.

As the rubbery dielectric 10, which can change from viscous-flowing to rubbery state, for example, a heat-conducting potting siloxane dielectric can be used, which is capable of sealing both in an open and closed volume. In Russia, such sealants are produced, for example, under the brand name SUREL-SL-KST (http://www.surel.ru/silicone/70/), a heat-conducting potting siloxane dielectric, which is a two-component system capable of changing from viscous state to elastic state after mixing components A and B, where component A is a filled organosilicon polymer, and component B is a cold curing catalyst.

In addition to the above properties, the used elastic dielectric exhibits:
moderate damping and shock-absorbing properties;
sufficient elasticity;
high dielectric properties;
resistance to high and low temperatures.

As will be apparent to those skilled in the art, other similar materials with similar properties can be used as the dielectric.

The dielectric 10 is poured into the housing 1 so that it does not get directly between the screen 8 and the protective glass of the housing 1, but fills air pockets inside the housing, to protect the screen, the electromagnetic resonance-based touchpad and the electronic components of the device from environmental and force effects as the depth is changing, as well as from shock and vibration.

Air pockets can be also filled with a dielectric fluid, such as transformer oil or silicone oil. The main thing is that the material should be chemically neutral with respect to the materials of the device and other components accommodated in the housing 1.

Figure 7:
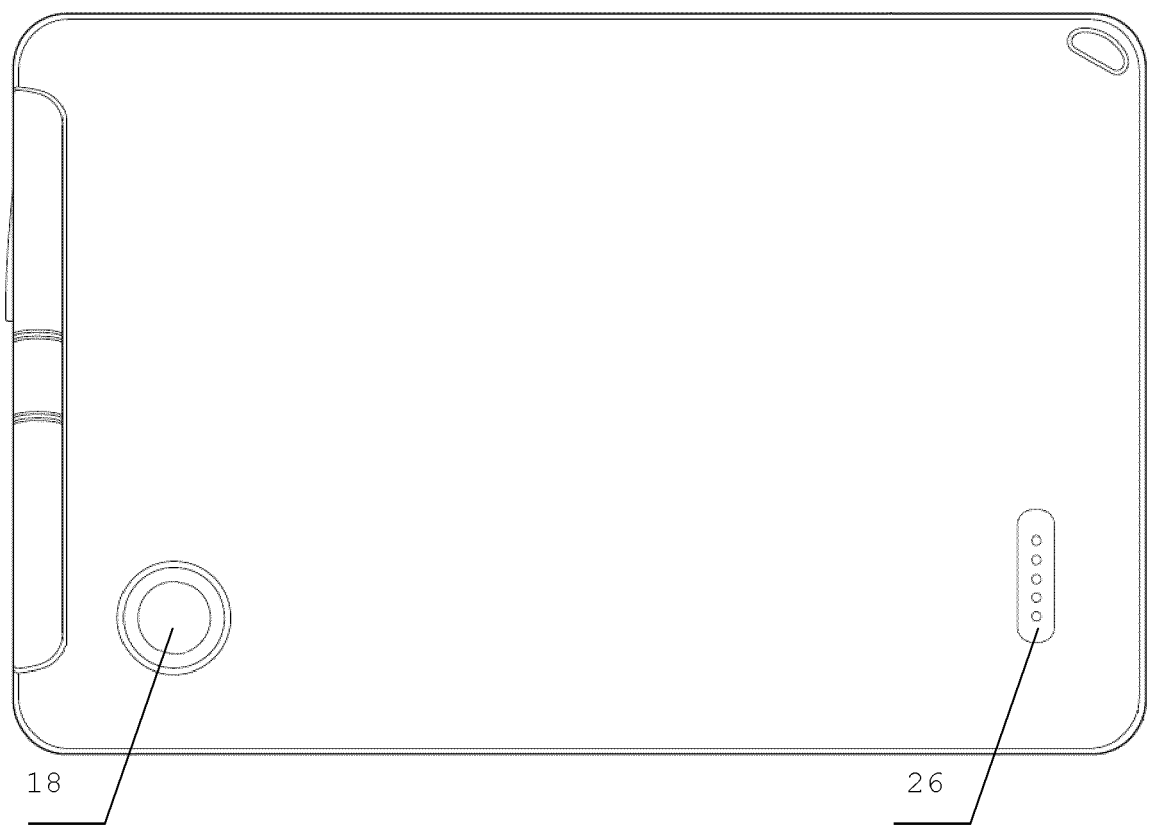
FIG. 7 is a back view of the device, including the rear housing part.

FIG. 7 shows a back view of the device, including back cover 9, back camera window 18 and stylus 5.

Upon mounting the screen 8, the electromagnetic resonance-based touchpad, electronic components, and electronic printed circuit board 6 with a reed switch or a Hall sensor 7, a dielectric 10 is poured into the back cover 9 of the information input and display device to fill free air cavities. Furthermore, the device may further comprise a pressure sensor for measuring depth variation, and an ambient temperature sensor transmitting this information directly to the memory of the device. These sensors must be electrically connected to the device.

Then, a sealing (not shown) and the protective glass 3 are mounted, the front panel 2 of the housing 1 is closed and secured by bolted connection along the entire perimeter (not shown). A different type of fastening can be chosen (adhesive bonding, ultrasonic welding, etc.).

The information input and display device for use underwater has a sealed port 26 for charging and data transmission via cable. In another embodiment, the device may have a wireless charging unit (not shown).

Figure 8:
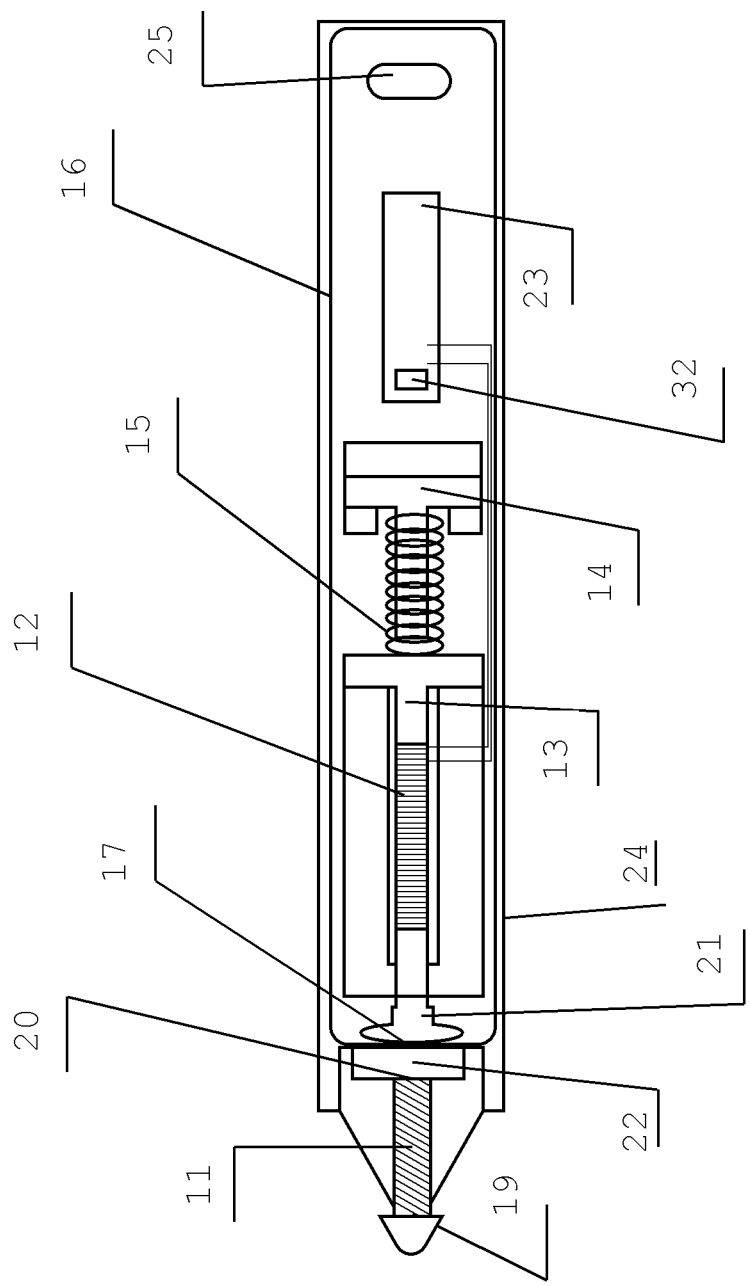
FIG. 8 is a sectional view of a wireless stylus according to one embodiment of the invention, accommodating an oscillator circuit with an inductor and components for changing the inductance of the inductor, where sealed part of the housing is formed by an impermeable capsule.

FIG. 8 shows the interior of a wireless stylus 5 for an environmentally-insulated, electromagnetic resonance-based information input and display device according to one embodiment of the invention, illustrated here by way of example only and not limiting the protection scope of the invention.

The stylus 5 comprises a housing 24 having a front housing part and a rear housing part, and an opening in the front housing part. The front housing part accommodates a tip 11 that is able to pass through the opening and move along the axis of the housing. The tip 11 has a front tip portion 19 protruding from the opening outside the housing to contact the protective glass of the device, and a rear tip portion 20.

According to this embodiment of the invention, an oscillator circuit is disposed inside the housing 24 of the stylus 5 and includes a capacitor 32 and an inductor 12 with a ferrite core. The capacitor 32 can be placed on a board 23 with additional necessary electronic components and must be electrically connected to the inductor. The ferrite core consists of two parts 13 and 14, one of which (13) in this particular embodiment of the invention is the base for winding the inductor 12 thereon, and the part 13 of the ferrite core is movable together with the inductor 12 along the axis of the housing with respect to the second part 14 of the ferrite core which is stationary relative to the housing.

The front and rear parts of the housing 24 are separated by an insulating means 16, which serves to insulate the oscillator circuit from the environment. The insulating means 16 is arranged to interact with the rear portion 20 of the tip 11 when mechanical stimulus is applied upon the front tip portion 19. Accordingly, mechanical stimulus of the rear tip portion 20 upon the movable part 13 of the ferrite core of the inductor 12 occurs through the insulating means 16.

According to this embodiment of the invention, the insulating means comprises an impermeable capsule 16, in which the oscillator circuit is enclosed.

The capsule 16 may be made of plastic, silicone or other material that does not shield the electromagnetic field. Moreover, the capsule 16 as such may contain a flexible membrane 17 for better transfer of force from the rear tip portion 20 of the stylus 11 to the movable part 13 of the ferrite core of the inductor 12.

To eliminate water pressure effect on the membrane and prevent incidental reduction in the distance between the movable part 13 of the ferrite core of the inductor and the stationary part 14 of the ferrite core, the interior of the impermeable capsule is filled with a dielectric fluid, for example, silicone oil; the main prerequisite is that the fluid should be chemically neutral with respect to the capsule material to avoid its damage or destruction. Furthermore, other electronic components placed in the stylus housing and necessary to ensure its operation and electrically connected with the oscillator circuit can be accommodated in the same impermeable capsule together with the inductor, ferrite core and resilient element, or in a separate impermeable capsule placed in the rear part of the stylus housing 24, or may be insulated by a dielectric inside the housing. To enhance protection, air pockets in the stylus interior can be filled with a rubbery dielectric. This measure is aimed at changing the resonant frequency of the stylus oscillator circuit by changing the inductance of the inductor of the oscillator circuit.

As mentioned above, the tip 11 is configured such that when mechanical stimulus is applied upon the front portion 19 of the tip 11, its rear portion 20 mechanically effects on the movable part 13 of the ferrite core of the inductor 12, and the movable part 13 of the ferrite core moves together with the inductor 12 relative to the stationary part 14 of the ferrite core, thereby changing the resonant frequency of the oscillator circuit.

Between the movable part 13 and the stationary part 14 of the ferrite core, a resilient element 15 can be placed, which interacts with these parts and promotes return of the movable part 13 to its initial position when mechanical stimulus upon the front portion 19 of the tip 11 is removed.

As shown in FIG. 8, the resilient element 15 can be made, for example, in the form of a spring (almost any type of non-conductive spring can be used), rubber, silicone or other resilient material able to accomplish the main task—to deform when the stylus tip touches the working surface of the screen or protective glass of the device, reducing the distance between the movable part 13 of the ferrite core of the inductor 12 and the stationary part 14 of the ferrite core, and return to its initial state upon termination of pressure upon the tip. The resilient element can be positioned between the inductor 12 with the movable part 13 of the ferrite core and the stationary part 14 of the ferrite core, or otherwise, subject to the specified task. As will be apparent to those skilled in the art, other embodiments of the resilient element are possible without going beyond the scope of the claims of the present invention.

When the front tip portion 19 contacts the protective glass 3 of the information input and display device, the rear tip portion 20 acts upon the movable part 13 of the ferrite core through the flexible membrane 16, while the spring 15 is compressed inside the stylus housing, reducing the distance between the inductor 12 and the movable part 13 of the ferrite core and the stationary part 14 of the ferrite core.

Upon termination of the mechanical effect upon the tip 11, the spring 15 is released and causes the movable part 13 of the ferrite core to return to its initial state.

To reduce the risk of damage to the flexible membrane 17, the movable part 13 of the ferrite core, on which the inductor 12 is wound, and the rear tip portion 20 may be further provided with washers 21 and 22, respectively, or another similar means of protection against damage to the flexible membrane 17. This increases the area at the point of contact of the rear tip portion 20 with the flexible membrane 17.

To eliminate the effect of water pressure on the membrane 17 and prevent incidental reduction in the distance between the movable part 13 of the ferrite core of the inductor and the stationary part 14 of the ferrite core, the interior of the impermeable capsule 16 is filled with a dielectric fluid chemically neutral with respect to the capsule material (not shown), for example, silicone oil or transformer oil. To enhance protection, air pockets in the wireless stylus interior can be filled with a rubbery dielectric.

The oscillator circuit is tuned to resonate with the inductive touch unit of the information input and display device.

In one embodiment of the invention, the electronic components 23 accommodated in the housing 24 of the stylus 5 and required to ensure its operation are placed in a separate impermeable capsule (not shown), or insulated by a rubbery dielectric.

Figure 9:
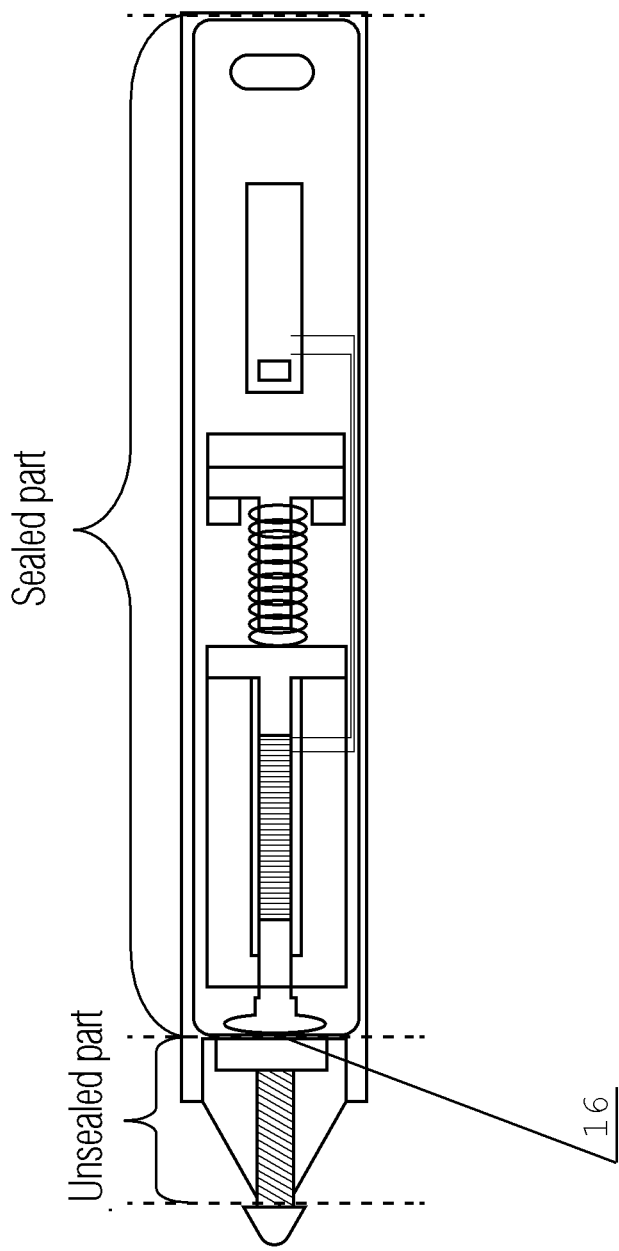
FIG. 9 is a sectional view of a wireless stylus according to another embodiment of the invention, in which sealed part of the housing is separated from non-insulated portion by a flexible membrane.

FIG. 9 shows another embodiment of the invention. The main difference between this embodiment and that of FIG. 8 is that the insulating means is a flexible membrane 17 separating the front housing part from the rear housing part.

The membrane can be made of rubber, silicone or other resilient material that can bend even under a slight mechanical effect upon it and return to its initial state when the mechanical effect is removed. It is preferable to use a material with Shore hardness not higher than 40A.

The impermeable part of the housing accommodates a ferrite core consisting of two parts 13 and 14, a resilient element 15, an inductor 12 and a capacitor 32. One of the parts, 13, of the ferrite core of the inductor 12 is arranged to move inside the impermeable part of the housing when mechanical stimulus is applied upon the front portion 19 of the tip 11. The impermeable part of the housing is filled with a dielectric fluid, and as mentioned above, the rear portion 20 of the tip 11 and the movable part 13 of the ferrite core are separated by a flexible membrane 17 through which the mechanical stimulus is transferred.

In this embodiment, the wireless stylus is reliably protected and can be used underwater without risk of damage, while maintaining its full functionality, including the ability to detect the state and position of the tip, and determine the amount and nature of effect upon it (sensitivity).

Figure 10:
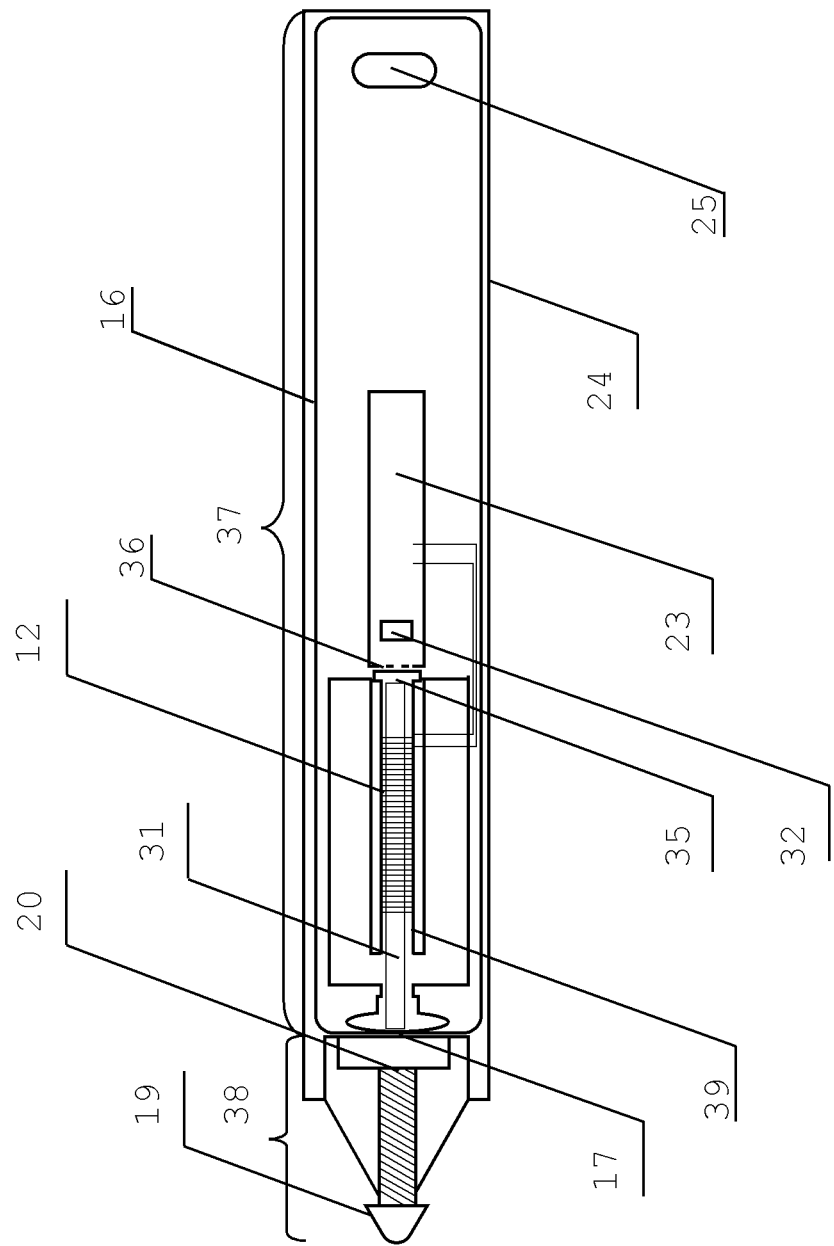
FIG. 10 is a sectional view of one more embodiment of a wireless stylus accommodating an oscillator circuit, in which the ferrite core of the inductor of the oscillator circuit has a longitudinal opening and a conductive element in the form of a resilient washer, acting as a variable resistor.

FIG. 10 shows another embodiment of the stylus.

The stylus comprises a housing having a front housing part 38 and a rear housing part 37, a flexible membrane 17 between the front housing and rear part, an opening in the front housing part, a tip 11 disposed in the front housing part and arranged to pass through the opening and move along the axis of the housing 24. The tip has a front tip portion 19 protruding from the opening outside the housing to contact the working surface or protective glass of the device, and a rear tip portion 20 in contact with the membrane 17. The rear housing part 37 of the stylus 5 accommodates an inductor 12 and a capacitor 32, forming an oscillator circuit. Here, the inductor 12 is wound on a ferrite core 39 with a longitudinal opening inside, through which an element 31 of diamagnetic material passes and can freely move inside, contacting on one side with the membrane 17, and on the other side with a conductive element 35 in the form of a resilient washer. At least the ferrite core 39 with the inductor, the capacitor 32, and the conductive element 35 are enclosed in an impermeable capsule 16 of plastic, silicone, or other material that does not shield electromagnetic field inside the stylus housing 24, while the rear tip portion 20 of the stylus and the ferrite core 39 of the inductor are separated by a flexible membrane 17. To eliminate the effect of water pressure on the membrane and to exclude incidental mechanical effects on the oscillator circuit components, the interior of the impermeable capsule 16 is filled with a dielectric fluid. In this embodiment, the pressure exerted on the front tip portion 19 at contact with the working surface or the protective glass of the device 3 is transferred through the flexible membrane 17 to the element 31 of a diamagnetic material placed in the ferrite core 39 and able to move inside, which, in turn, transfers pressure on the element 35 of conductive resilient material, causing it to either shrink and press against contacts of the stylus board 23, or to decompress, changing the resistance of the electrical circuit of the oscillator circuit. In this embodiment, contacts of the stylus board 23 comprise an electrode through which the electrical circuit part formed by tracks (contacts) is connected to another part of the circuit.

This arrangement is aimed at changing the resonant frequency of the stylus oscillator circuit by changing the resistance of the electrical circuit of the oscillator circuit.

Figure 11:
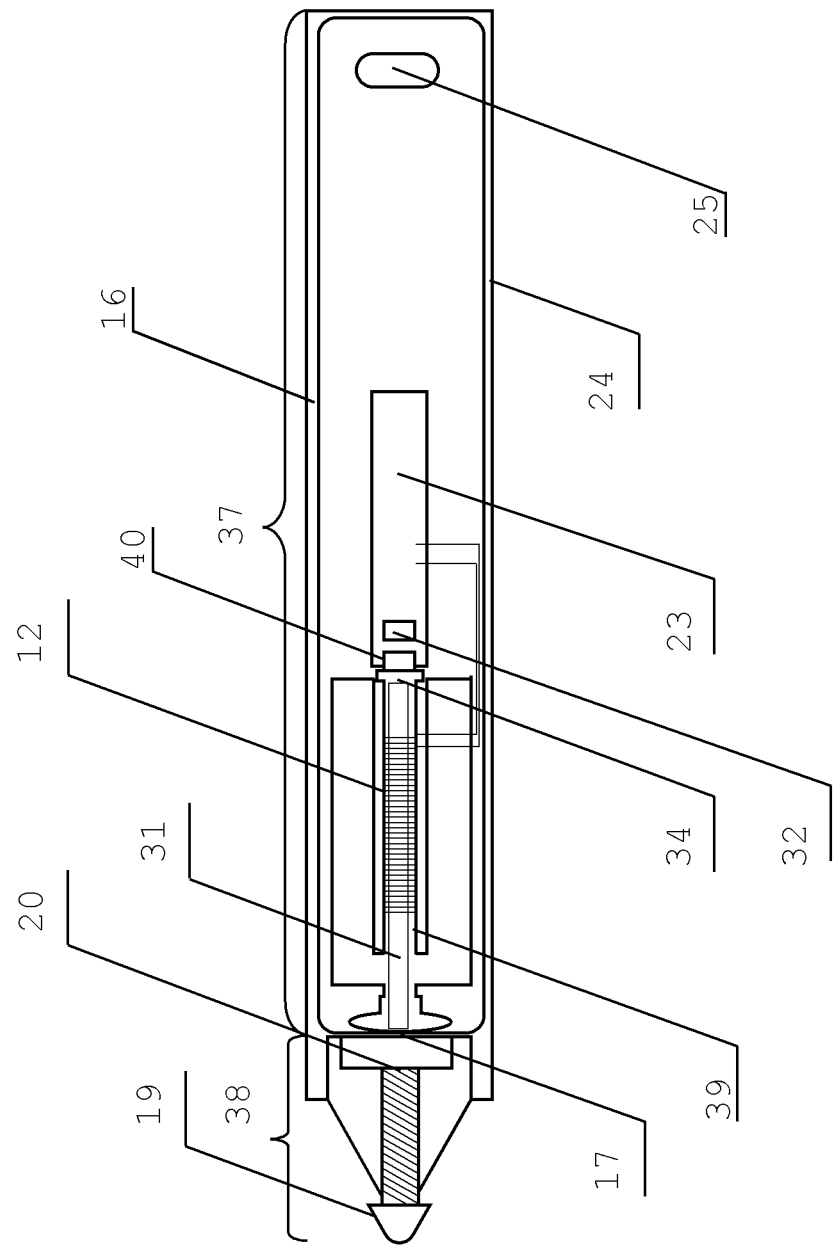
FIG. 11 is a sectional view of a wireless stylus accommodating an oscillator circuit with a variable resistor and components for changing the resistance of the resistor.

FIG. 11 shows another embodiment of a wireless stylus that comprises a housing 24 having a front housing part 38 and a rear housing part 37, a flexible membrane 17 between the front housing 38 and rear part 37, an opening (not shown) in the housing 24 front part, a tip 11 disposed in the front housing part and arranged to pass through the opening and move the tip 11 along the axis of the housing 24. The tip 11 has a front portion 19 protruding from the opening outside the housing to contact with protective glass of the device 3, and a rear portion 20 in contact with the membrane 17. The rear housing part 37 of the stylus accommodates an inductor 12, a capacitor 32 and a resistor 40, forming an oscillator circuit. At least the inductor 12, the capacitor 32 and the resistor 40 are enclosed in an impermeable capsule 16 made of plastic, silicone or other that material does not shield electromagnetic field, inside the stylus housing 24, while the rear tip portion 20 of the stylus and the inductor 12 are separated by a flexible membrane 17, which is part of the capsule 16. To eliminate the effect of water pressure on the membrane 17 and to exclude incidental effects on the oscillator circuit components, the interior of the impermeable capsule 16 is filled with a dielectric fluid. The inductor 12 is wound on a ferrite core 39 having a longitudinal opening inside, through which an element of a diamagnetic material 31 passes and can freely move inside, contacting on one side with the membrane 17, and on the other side with a resistor 40. The rear part of the element of a diamagnetic material has a washer 34 from a resilient material, which serves as a means for returning this element when the mechanical stimulus on it terminates. In this embodiment, the pressure exerted on the front tip portion 19 in contact with the protective glass of the device 3 is transferred through the flexible membrane 17 to the element of a diamagnetic material 31 placed in a ferrite core 39 and movable inside, which, in turn, transmits pressure to the resistor 40, which changes its resistance when mechanical stimulus is applied upon it.

This embodiment is aimed at changing the resonant frequency of the oscillator circuit of the stylus by changing the resistance of the resistor.

Figure 12:
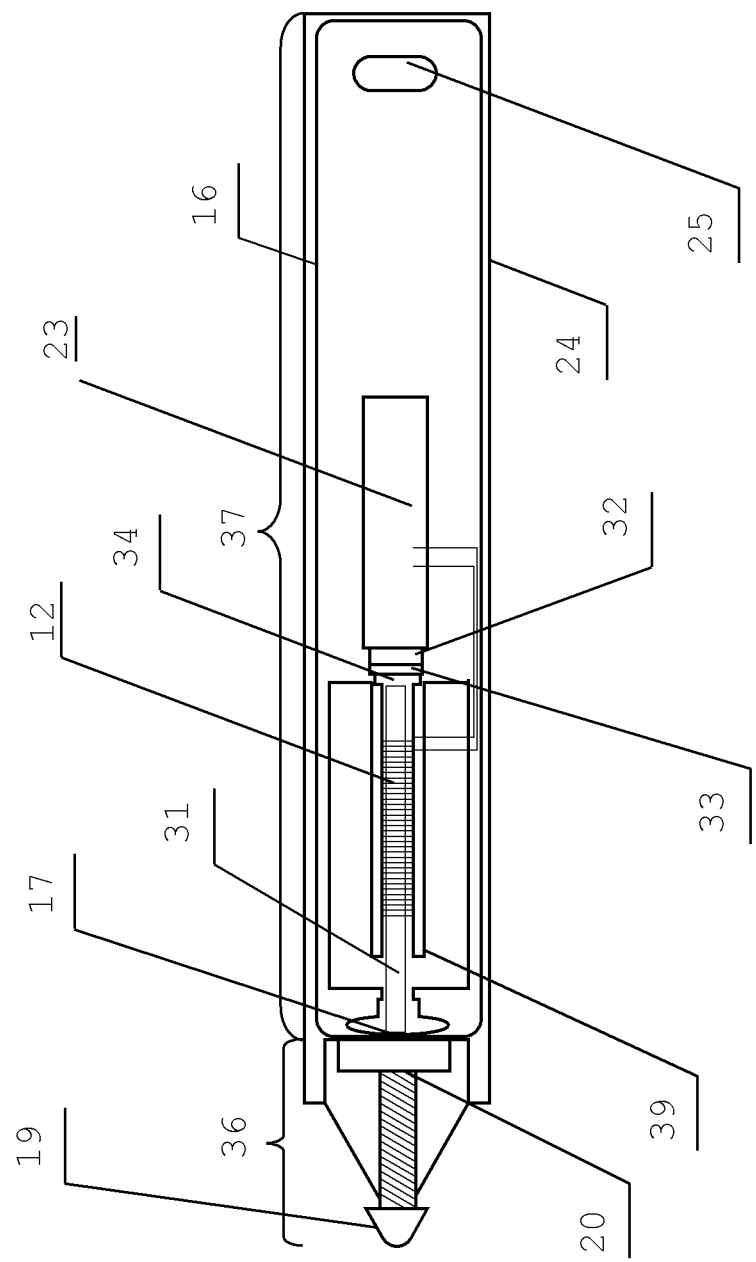
FIG. 12 is a sectional view of the wireless stylus accommodating an oscillator circuit with a variable capacitor and components for changing the capacitance of the capacitor.

FIG. 12 shows another embodiment of the wireless stylus 5. The stylus 5 comprises a housing 24 having a front housing part 38 and a rear housing part 37, a flexible membrane 17 between the front housing part 38 and rear part 37, an opening in the front housing part (not shown), a tip 11 disposed in the front housing part 38 and arranged to pass through the opening and move along the axis of the stylus housing 24. The tip 11 has a front portion 19 protruding from the opening outside the housing 24 to contact the protective glass of the device 3, and a rear portion 20 in contact with the membrane 17. The stylus rear housing part 37 accommodates a ferrite core 39 with an inductor 12 and a capacitor 32, forming an oscillator circuit. Chosen as a variable capacitor is a capacitor whose capacitance electric can be changed mechanically, or electrically, under the effect of changing the voltage applied to the plates. Variable capacitors are used in oscillator circuits and other frequency-dependent circuits to change their resonant frequency. The present invention uses a variable capacitor, whose capacitance changes responsive to mechanical pressure on the capacitor cover and deflection of one of capacitor plates. For example, the capacitor LXRW19V201-058, Murata Variable Capacitor 100→200 pF 5.3V can be used. Here, the inductor is wound on a ferrite core with a longitudinal opening inside, through which an element of a diamagnetic material 31 passes and is freely movable inside, in contact, on one side, with the membrane and, on the other side, with the variable capacitor cover directly or through a washer made of resilient material. An element of a diamagnetic material passes through the core of the capacitor, and pressure on the front tip portion is transferred to the variable capacitor cover, the pressure magnitude depending on the pressure on the cover. The resilient washer 34 is necessary to ensure that the element of a diamagnetic material returns to its initial position when the mechanical stimulus upon the stylus tip terminates. At least the inductor 12 and the capacitor 32 are enclosed in an impermeable capsule 16 made of plastic, silicone or other material that does not shield electromagnetic field, inside the stylus housing 24, while the stylus rear tip portion 20 and the ferrite core 39 on which the inductor 12 is wound, are separated by a flexible membrane 17, which is part of the capsule 16. The inductor 12 is wound on a ferrite core 38 having a longitudinal opening inside, through which the element of a diamagnetic material 31 passes and freely moves in it, contacting, on one side, with the membrane 17, and, on the other side, with the cover of the variable capacitor 33 directly or through a resilient washer 34. The element of a diamagnetic material 31 passes through the ferrite core 39 of the inductor 12, and the pressure on the front tip portion 19 is transmitted to the cover 33 of the variable capacitor 32, the pressure magnitude depending on the force applied to the cover. The resilient washer 34 is necessary to ensure that the element of a diamagnetic material 31 returns to its initial position when the mechanical stimulus upon the tip of the stylus 11 terminates. To prevent the effect of water pressure on the membrane 17 and exclude incidental effects on the oscillatory circuit components, the interior of the impermeable capsule 16 is filled with a dielectric fluid. In this embodiment, the pressure exerted on the front tip portion 19 at contact with the protective glass of the device 3 is transmitted through the flexible membrane 17 to the element of a diamagnetic material 31 accommodated in the ferrite core 39 and able to move inside, which, in turn, transmits pressure to the variable capacitor 31 through the resilient washer 34. With increasing the pressure force, the capacitance increases, and the resonant frequency decreases.

This embodiment is aimed at changing the resonant frequency of the oscillator circuit of the stylus by changing the capacitance of the capacitor.

The device works as follows.

An inductive touch unit disposed under the screen of an information input and display device generates, when alternating voltage is applied to it, an electromagnetic field on the screen surface. Stylus, used as a pointer, comprises an oscillator circuit tuned to resonate with the inductive touch unit of the device. When the stylus is brought close to the screen, the circuit modulates the electromagnetic field, changing the inductance of printed inductors of the inductive touch unit, disposed under the screen. The closer the inductor of the touch unit to the oscillator circuit of the stylus, the greater the change in its inductance.

When the front portion 19 of the tip 11 of the stylus 5 touches the protective glass 3 of the information input and display device, the tip 11 is pressed and mechanically effects (by pushing along the longitudinal axis), through the wall of the impermeable capsule 16 or through the flexible membrane 17 in the wall, on the movable part 13 of the ferrite core of the inductor 12, thereby reducing the distance between the movable 13 and stationary 14 parts of the ferrite core of the inductor 12 and changing the inductance frequency of the oscillator circuit and modulating the electromagnetic field of the required frequency. In another embodiment, when the front portion 19 of the tip 11 of the stylus 5 touches the protective glass 3 of the information input and display device, the tip 11 is pressed and mechanically effects (by pushing along the longitudinal axis), through the wall of the impermeable capsule 16 or through the flexible membrane 17 in the wall, the cover of the variable capacitor 32 thereby changing its capacitance, or the resistor 40 thereby changing its resistance, and, accordingly, thereby changing the resonant frequency of the oscillator circuit and modulating the electromagnetic field of the required frequency. In another embodiment, the resonant frequency of the oscillator circuit is changed by changing the resistance of the electrical circuit of the oscillator circuit by transferring mechanical stimulus from the tip 11 of the stylus 5 to the conductive element 35, which shrinks under the pressure and presses against the electrode electrically connected to the oscillator circuit, and then expands, causing a change in the resonant frequency of the oscillator circuit and modulation of the electromagnetic field of the required frequency.

A microcontroller registers parameters of the inductors and calculates position of the stylus. The stylus does not have own power supply, however, the signal emitted by an electromagnetic resonance-based touchpad containing an inductive touch unit is used to power the stylus, which in turn sends a response signal that is not just a reflection of the initial signal, but a newly generated signal which typically carries additional information identifying the particular stylus, data on the pressure force, stylus location and other characteristics necessary to form a high quality image on the screen.

The processed stylus signal is converted into coordinates and transmitted to the device screen configured to display these coordinates as dots on the screen, corresponding to the stylus location, and thus form an image that can be viewed by the user through the protective glass of the device.

In any of these embodiments, the stylus according to the present invention is reliably protected and can be used underwater without risk of damage, while retaining the full functionality inherent to an electromagnetic pen when interacting with the electromagnetic resonance-based touchpad, including the provision of variable sensitivity levels of the pen.

The present information input and display device for use underwater and wireless stylus can be manufactured and practiced by a skilled person, and ensures the attainment of the specified object.

A test device was manufactured in accordance with the present invention, comprising:
   a waterproof housing accommodating a LCD screen with a capacitive touchpad located under the screen and having printed inductors, a microcontroller, a wireless data transmission unit, a memory unit, a lithium-ion battery and other electronic components necessary for operation of the device and substantially representing, in combination, a variant of a tablet computer;
   a means for non-contact on/off switching of the device, using a Hall sensor;
   a wireless stylus according to the present invention;
   the device housing had a window with protective, chemically-hardened, transparent glass 3 mm thick, for access to the screen,
   the device housing was made of anodized aluminum with a wall thickness of 3 mm;
   air pockets of the device after accommodating all the aforementioned components in it were filled with a rubbery dielectric.

The test information input and display device for use underwater was tested in accordance with a test plan in four stages:
   at the first test stage, the efficiency of information input on the surface was tested using the touchpad through the protective glass. The operator switched on the device using the wireless stylus with a magnet inside by applying it to a specified place on the housing. Further, after loading the operating system, the operator alternately launched desktop applications (main screen) with his finger. All applications opened, and the capacitive touchpad responded properly to finger taps. At the end of this test, the device was switched off by applying the electromagnetic stylus with a magnet to a specified place on the housing;
   at the second test stage, the device was submerged underwater to a depth of 40 meters at the water temperature of +28 degrees. Under these test conditions, the device was fully functional throughout the entire test cycle consisting of ten dives, each for 45-60 minutes. With this, information was input underwater with a wireless stylus disclosed in the present invention. This test showed effective performance of the device, and exhibited the highest accuracy in determining the location of the electromagnetic stylus and data entry: it was possible to activate the smallest icons, as well as to draw, make notes, store in memory and display necessary information from memory:
   at the third stage (after the series of underwater tests), the strength of the device was tested as follows: the device was dropped from a height of 15 meters (approximately the level of the second floor of a residential building) 10 times. With the exception of small chips and dents on the housing, the device did not suffer any serious damage and retained its functionality to full extent;
   at the fourth stage, the strength of the protective glass of the device housing was tested. A metal object weighing 2.5 kg (sports dumbbell) was dropped 10 times from a height of 1.5 meters onto the device placed on a flat hard surface. Inspection of the device showed that the fall of the object did not cause any visible damage.

Therefore, the invention attained the specified object, the provision of a durable and reliable information input and display device for use underwater, which enables non-contact on/off switching of the device, increases accuracy of entering information when working with the screen underwater, and also reliably protects electronic components of the device, including the screen, from mechanical damage under a variety of operating conditions.

The object of providing a wireless stylus that works underwater and permits entering information into the device with a high level of accuracy was also achieved.

The inventive information input and display device for use underwater and a wireless stylus can be used by amateur divers and commercial divers, underwater archaeologists and other researchers, underwater services and repair and construction teams (for example, at oil platforms, dams, etc.), as well as operators of underwater unmanned vehicles (drones) and users of underwater navigation systems.

What is claimed is:

1. A wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion;

an oscillator circuit disposed in the rear housing part and tuned to resonate with an inductive touch unit of the information input and display device, said circuit comprising at least a capacitor and an inductor with a ferrite core split into two parts, one of the parts being stationary, and the other one being movable along the housing axis relative to the first part of the core;

an insulating means for insulating the oscillator circuit from the environment, said insulating means being arranged to interact with the rear tip portion when mechanical stimulus is applied upon the front tip portion to transfer the mechanical stimulus from the tip to the movable part of the ferrite core of the inductor and provide relative movement of the movable part of the core with respect to the stationary part thereof for changing the resonant frequency of the oscillator circuit.

2. The stylus of claim 1, wherein the insulating means comprises a flexible membrane separating the front housing part from the rear housing part.

3. The stylus of claim 1, wherein the insulating means comprises an impermeable capsule accommodated in the housing, filled with a dielectric fluid and enclosing the oscillator circuit.

4. The stylus of claim 3, wherein the capsule contains a flexible membrane arranged to interact with the rear tip portion when mechanical stimulus is applied upon the front tip portion.

5. The stylus of claim 3, wherein the capsule comprises a means for returning the movable part of the core to its initial position upon removing the mechanical stimulus from the front tip portion, said means being located between the movable part and the stationary part of the ferrite core of the inductor.

6. The stylus of claim 1, wherein the stylus is adapted to change the resonant frequency by changing the inductance of the inductor.

7. The stylus of claim 1, wherein the rear housing part has a magnet arranged to interact with a reed switch or a Hall sensor of the information input and display device for non-contact switching-on of the device when the stylus with the magnet is brought to a specified place on the device housing.

8. A wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion;

an oscillator circuit disposed in the rear housing part and tuned to resonate with an inductive touch unit of the information input and display device, said circuit comprising at least an inductor with a ferrite core having a longitudinal opening, and a capacitor;

an element of a diamagnetic material arranged to move in the opening of the ferrite core and interact with the oscillator circuit components;

an insulating means for insulating the oscillator circuit from the environment, said means being arranged to interact with the rear tip portion when mechanical stimulus is applied upon the front tip portion to transfer the mechanical stimulus from the tip to the element of a diamagnetic material and move the element of a diamagnetic material relative to the ferritic core of the inductor, thereby transferring the mechanical stimulus from the tip to one of the oscillator circuit components for changing the resonant frequency.

9. The stylus of claim 8, wherein the insulating means comprises a flexible membrane separating the front housing part from the rear housing part.

10. The stylus of claim 8, wherein the insulating means comprises an impermeable capsule accommodated in the housing, filled with a dielectric fluid and enclosing the oscillator circuit.

11. The stylus of claim 10, wherein the capsule contains a flexible membrane arranged to interact with the rear tip portion when mechanical stimulus is applied upon the front tip portion.

12. The stylus of claim 10, wherein the capsule comprises a means for returning the element of a diamagnetic material to its initial position upon removing the mechanical stimulus from the front tip portion.

13. The stylus of claim 8, wherein the oscillator circuit further comprises a resistor and is adapted to change the resonant frequency by changing the resistance of the resistor.

14. The stylus of claim 8, wherein the stylus is adapted to change the resonant frequency by changing the resistance of the electrical circuit.

15. The stylus of claim 8, wherein the stylus is adapted to change the resonant frequency by changing the inductance of the inductor.

16. The stylus of claim 8, wherein the stylus is adapted to change the resonant frequency by changing capacity of the capacitor.

17. The stylus of claim 8, wherein the rear housing part accommodates a magnet arranged to interact with a reed switch or a Hall sensor of the information input and display device for non-contact switching-on of the device when the stylus with the magnet is brought to a specified place on the device housing.

18. A wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion;

an oscillator circuit disposed in the rear housing part and tuned to resonate with an inductive touch unit of the information input and display device, said circuit comprising at least an inductor and a capacitor;

the capacitor being adapted to change the capacity when mechanical stimulus is applied upon it;

an insulating means for insulating the oscillator circuit from the environment, said means being arranged to interact with the rear tip portion when mechanical stimulus is applied upon the front tip portion to transfer the mechanical stimulus from the tip to the capacitor for changing the resonant frequency of the oscillator circuit, wherein the rear housing part accommodates a magnet arranged to interact with a reed switch or a Hall sensor of the information input and display device for non-contact switching-on of the device when the stylus with the magnet is brought to a specified place on the device housing.

19. The stylus of claim 18, wherein the insulating means comprises a flexible membrane separating the front housing part from the rear housing part.

20. The stylus of claim 18, wherein the insulating means comprises an impermeable capsule accommodated in the housing, filled with a dielectric fluid and enclosing the oscillator circuit.

21. The stylus of claim 20, wherein the capsule contains a flexible membrane arranged to interact with the rear tip portion when mechanical stimulus is applied upon the front tip portion.

22. The stylus of claim 21, wherein the capsule comprises a means for returning the tip to its initial position upon removing the mechanical stimulus from the front tip portion.

23. A wireless electromagnetic resonance-based stylus for an environmentally-insulated information input and display device, said stylus comprising: a housing having a front housing part and a rear housing part, and an opening in the front housing part; a tip disposed in the front housing part and arranged to pass through the opening and move along the axis of the housing, said tip having a front tip portion protruding from the opening beyond the housing to contact a protective glass of the device, and a rear tip portion;

an oscillator circuit disposed in the rear housing part and tuned to resonate with an inductive touch unit of the information input and display device, said circuit comprising at least an inductor, a capacitor, and a resistor;

the resistor being adapted to change the resistance when mechanical stimulus is applied upon it;

an insulating means for insulating the oscillator circuit from the environment, said means being arranged to interact with the rear tip portion when mechanical stimulus is applied upon the front tip portion to transfer the mechanical stimulus from the tip to the resistor for changing the resonant frequency of the oscillator circuit.

24. The stylus of claim 23, wherein the insulating means comprises a flexible membrane separating the front housing part from the rear housing part.

25. The stylus of claim 23, wherein the insulating means comprises an impermeable capsule accommodated in the housing, filled with a dielectric fluid and enclosing the oscillator circuit.

26. The stylus of claim 25, wherein the capsule contains a flexible membrane arranged to interact with the rear tip portion when mechanical stimulus is applied upon the front tip portion.

27. The stylus of claim 25, wherein the capsule accommodates a means for returning the tip to its initial position upon removing the mechanical stimulus from the front tip portion.

28. The stylus of claim 23, wherein the rear housing part has a magnet arranged to interact with a reed switch or a Hall sensor of the information input and display device for non-contact switching-on of the device when the stylus with the magnet is brought to a specified place on the device housing.

* * * * *